Figure 1:
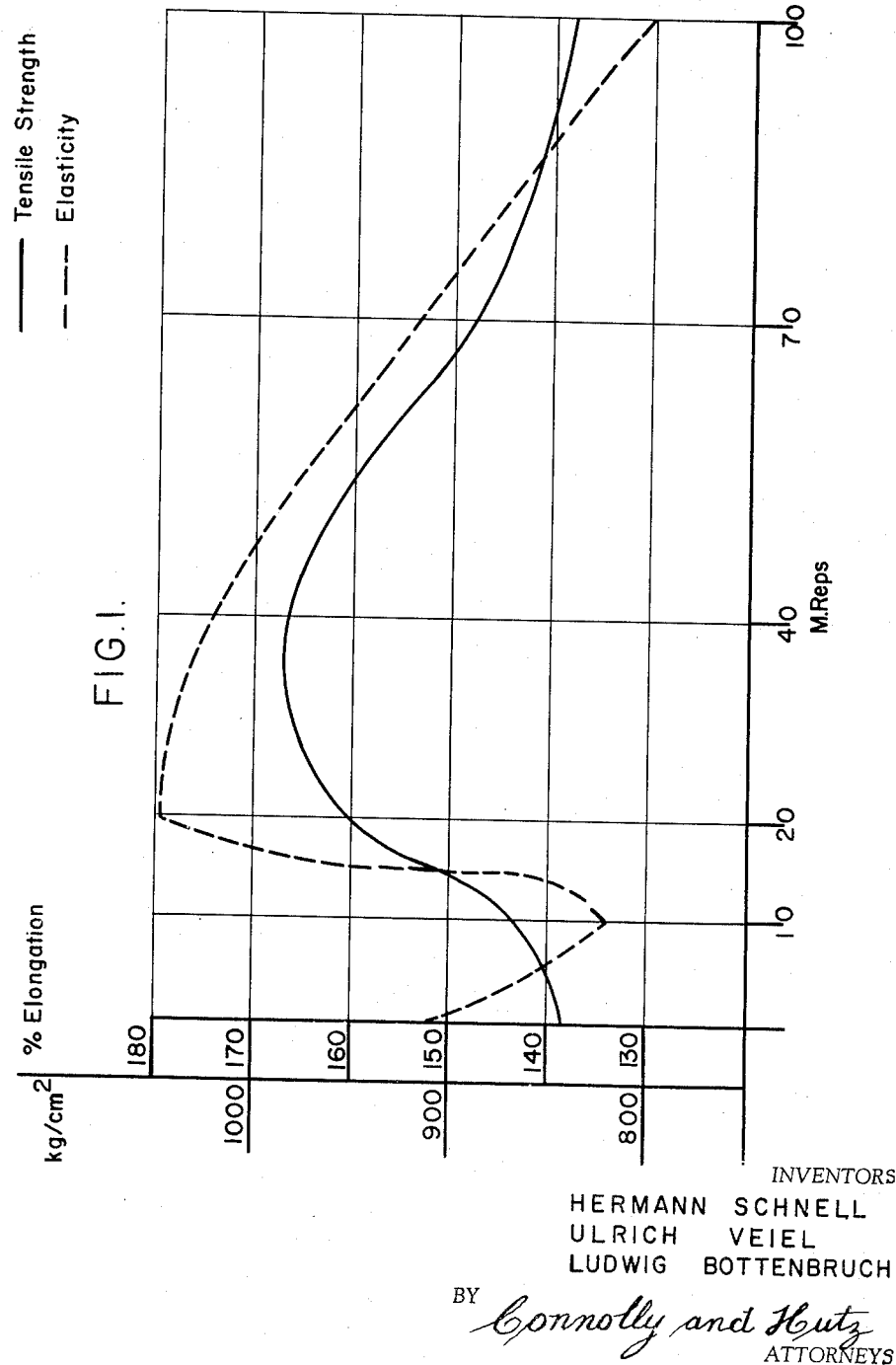

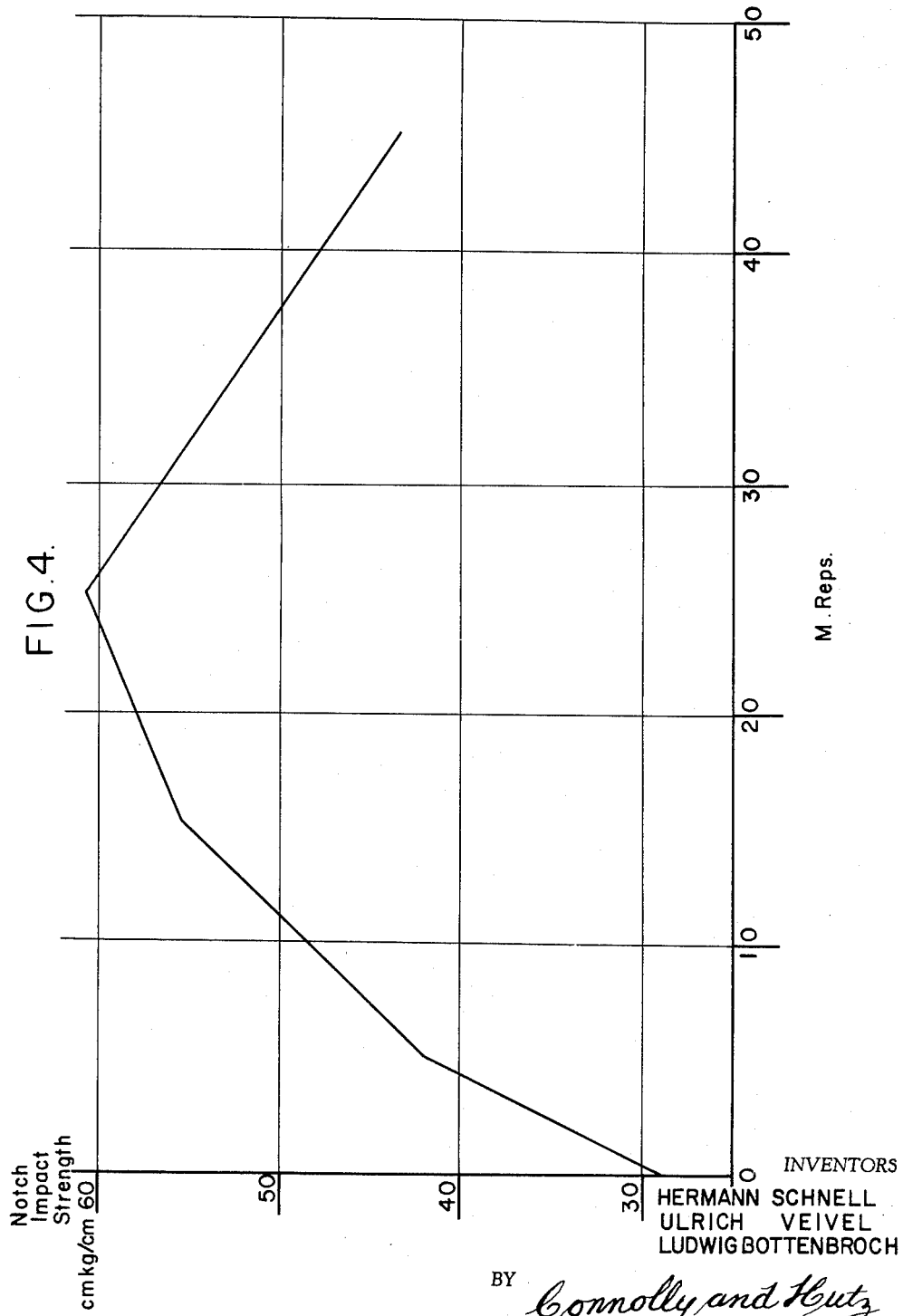

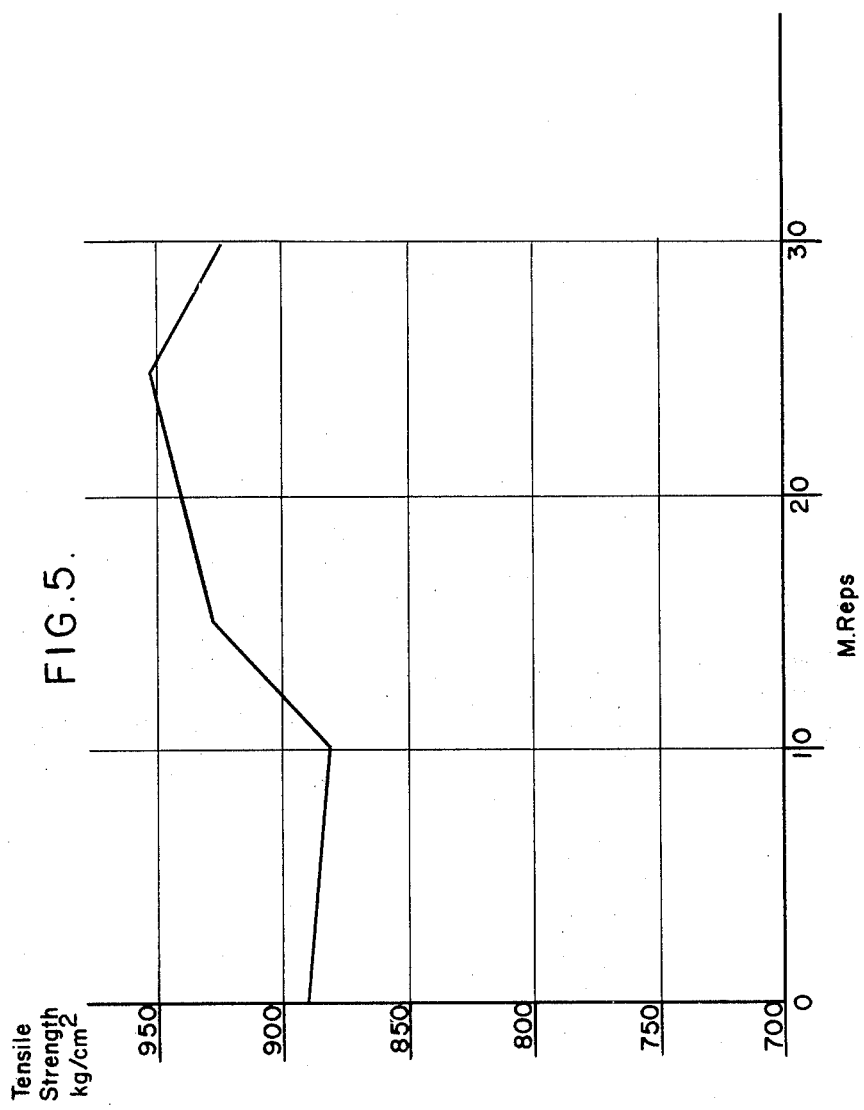

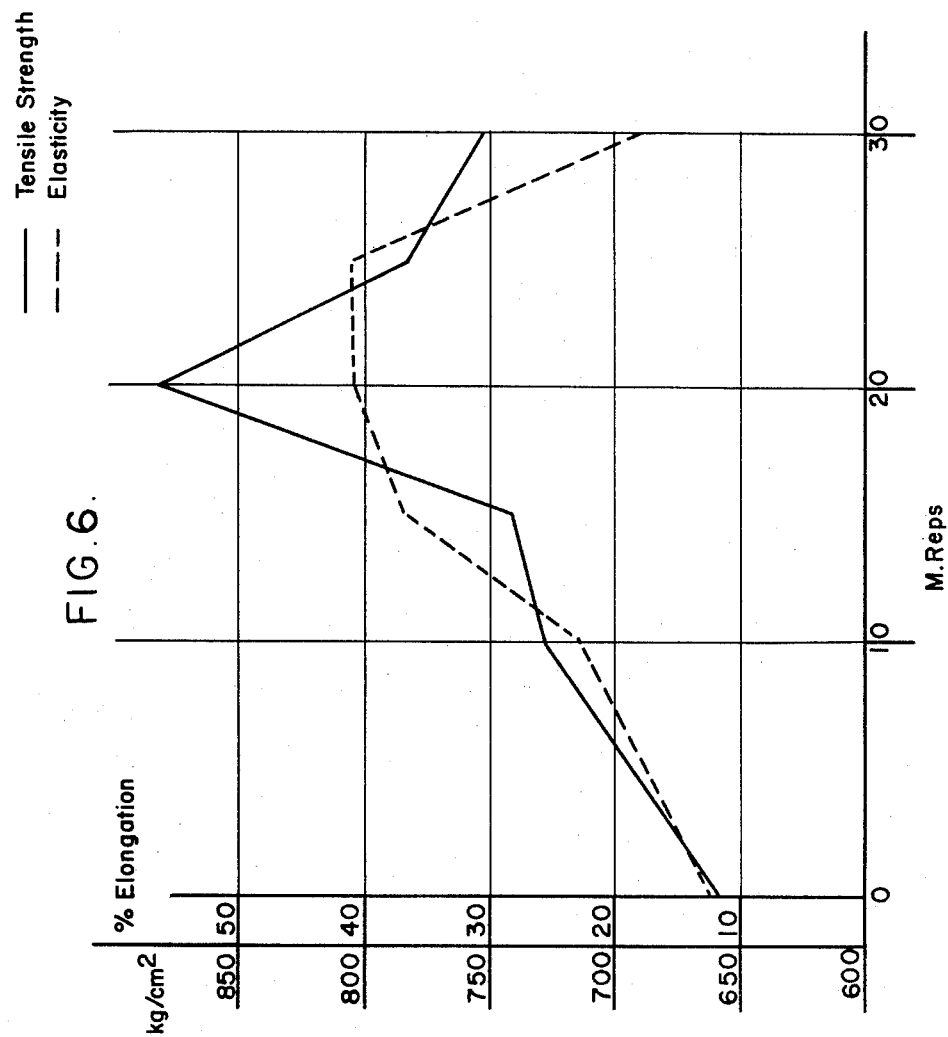

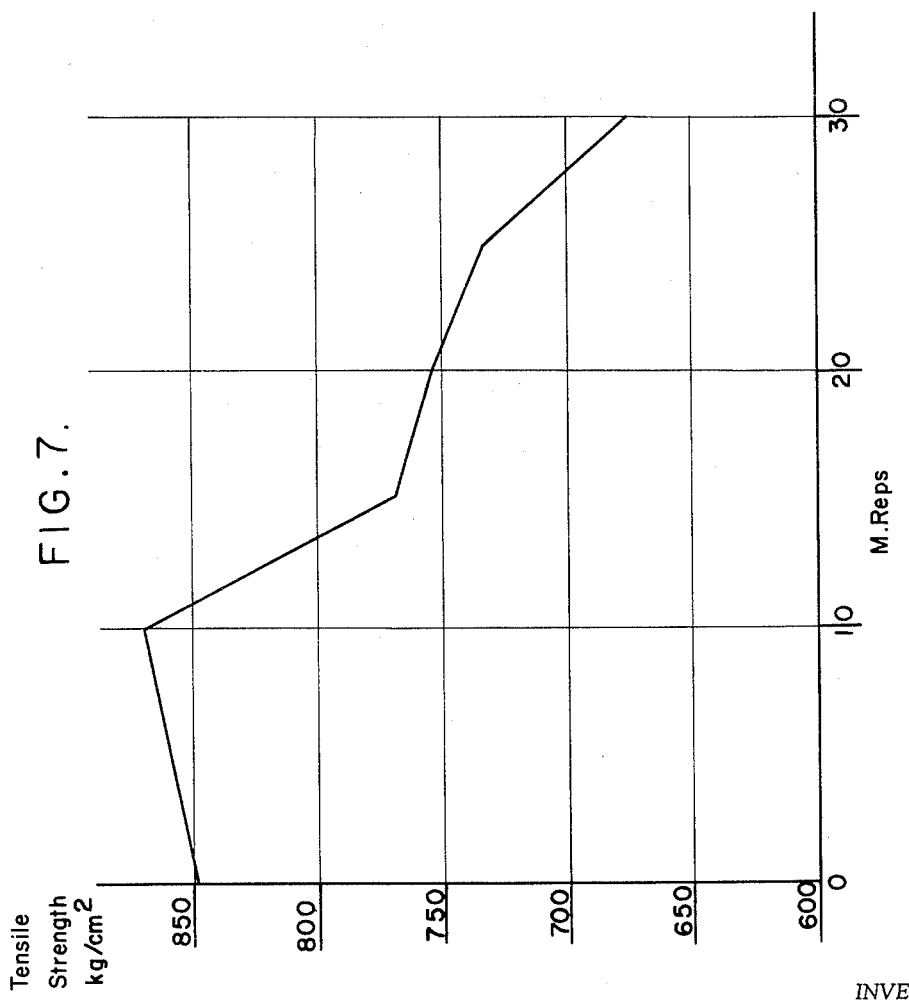

United States Patent Office 3,150,066
Patented Sept. 22, 1964

3,150,066
PROCESS FOR THE ALTERATION OF THE PHYSICAL AND CHEMICAL PROPERTIES OF POLYCARBONATES
Hermann Schnell and Ulrich Veiel, Krefeld-Uerdingen, and Ludwig Bottenbruch, Krefeld-Bockum, Germany, assignors to Farbenfabriken Bayer Aktiengesellschaft, Leverkusen, Germany, a corporation of Germany
Filed June 30, 1959, Ser. No. 824,108
Claims priority, application Germany July 2, 1958
11 Claims. (Cl. 204—154)

This invention is concerned with a process for the alteration of the physical and chemical properties of polycarbonates.

It is known that high molecular weight linear materials, such as polyethylene, polyacrylic esters, polystyrene and rubber, undergo chemical alterations by irradiation with energy-rich rays such as neutron, electron, Röntgen or ultra violet rays, the degree of chemical change depending upon the intensity and length of the irradiation. The chemical changes which take place are, for example, a reduction in solubility, an increase in the melting range and improved chemical properties. It has been ascertained that such improvements of the properties only occur in those high molecular weight polymers in which a considerable number of aliphatically bound carbon atoms are present in the chain which carbon atoms still carry one or two hydrogen atoms of which at least two are adjacent (cf. Lawton, J. Polymer Science, 14, 503/1954).

We have now found, surprisingly, that polycarbonates based on dihydroxy-diaryl-methanes, their homologues and equivalents, in which such carbon atoms are either only present in a small number or are even absent, also undergo an appreciable improvement in the physical properties by irradiation with energy-rich rays but only by a somewhat narrowly limited specific irradiation dose. Larger irradiation doses bring about a clear deterioration of the properties.

The fact that the physical properties of the polycarbonates of the type mentioned above are improved by irradiation according to the invention was especially surprising, since the shear, the impact and the tensile strength and the elasticity of other polycarbonates such as the polymeric allyl diglycol carbonates are lowered by a corresponding irradiation while, for instance, the poly-(ethylene glycol terephthalate), indeed, resists the destruction by energy-rich rays better than the polycarbonates just mentioned; an improvement of their properties however is not known to occur.

According to the present invention, the high molecular weight polycarbonates to be treated are, for example, those based upon dihydroxy-diaryl-alkanes, such as 4,4′-dihydroxy-diphenyl-methane, 2,2-(4,4′-dihydroxy-diphenyl)-propane, -butane, -pentane, -4-methyl-pentane, 1,1-(4,4′-dihydroxy-diphenyl)-ethane, -butane, -isobutane, -cyclohexane, 2,2-(4,4′-dihydroxy-3,3′-dimethyl-diphenyl)-propane and 2,2-(4,4′-dihydroxy-3,3′,5,5′-tetrachloro-diphenyl)-propane or mixtures of such dihydroxy-diaryl alkanes.

Equivalents of these polycarbonates are, for instance, the corresponding polycarbonate of dihydroxy-diaryl ether, -thioether, and -sulfone.

The irradiation can take place with neutron, electron, Röntgen or γ-rays or other energy-rich rays or rays which produce energy-rich rays, such as thermal neutrons.

The irradiation can be carried out at room temperature or at lower or higher temperatures up to the softening point of the polycarbonates. It can take place in air or in inert media, such as nitrogen or carbon dioxide, or also in a vacuum.

The amount of irradiation which is suitable in order to bring about the desired alteration of the properties depends essentially upon the type of the polycarbonate to be irradiated and is always to be ascertained quite easily by simple experiments. Generally suitable doses of irradiation are from about 5 to about 50 mega Roentgen equivalent physicals (with reference to this scale, see, f.i., F. H. Bovey, "The Effects of Ionising Radiation on Natural and Synthetic High Polymers," Interscience Publishers, Inc., New York, 1958, especially page 33). In the following examples and in the drawings this scale is abbreviated with "M.Rep."

How the alteration of the properties of the polycarbonates of some types depends upon the irradiation doses, that is shown in the following examples.

In FIGURE 1 there is shown, for example, the alteration of the tensile strength and of the elasticity of a foil made from polycarbonate based upon 2,2-(4,4′-dihydroxy-diphenyl)-propane with a relative viscosity of 1.70 (measured in a 0.5 percent methylene chloride solution at 25° C.) and a thickness of 100μ in dependence upon the irradiation dose (van de Graaf generator, 2 mega electron volts, irradiation in air at room temperature). The broken line in FIGURE 1 denotes elasticity and it will be evident that the elasticity of the polycarbonate sample begins to fall at the beginning of radiation, reaches a minimum at 10 mr., and regains its original value at about 15 mr. dosage. From there on, the elasticity value of the sample remains above its starting value until the mr. dosage reaches about 71 mr. Then at higher radiation dosages, the elasticity falls below its original value. This establishes a lower limit of 15 mr. and an upper limit of about 71 mr. for the range of radiation dosage which will improve the elasticity of the polycarbonate sample.

FIGURE 1 shows that the tensile strength of the sample (the heavy unbroken line) begins to rise as soon as it is exposed to radiation and the tensile strength remains above its starting value until the radiation dosage is equal to 100 mr. At that point, the tensile strength is about the same as it was when radiation began. This establishes an effective dosage range of about 100 mr. for increasing the tensile strength.

Figure 2:
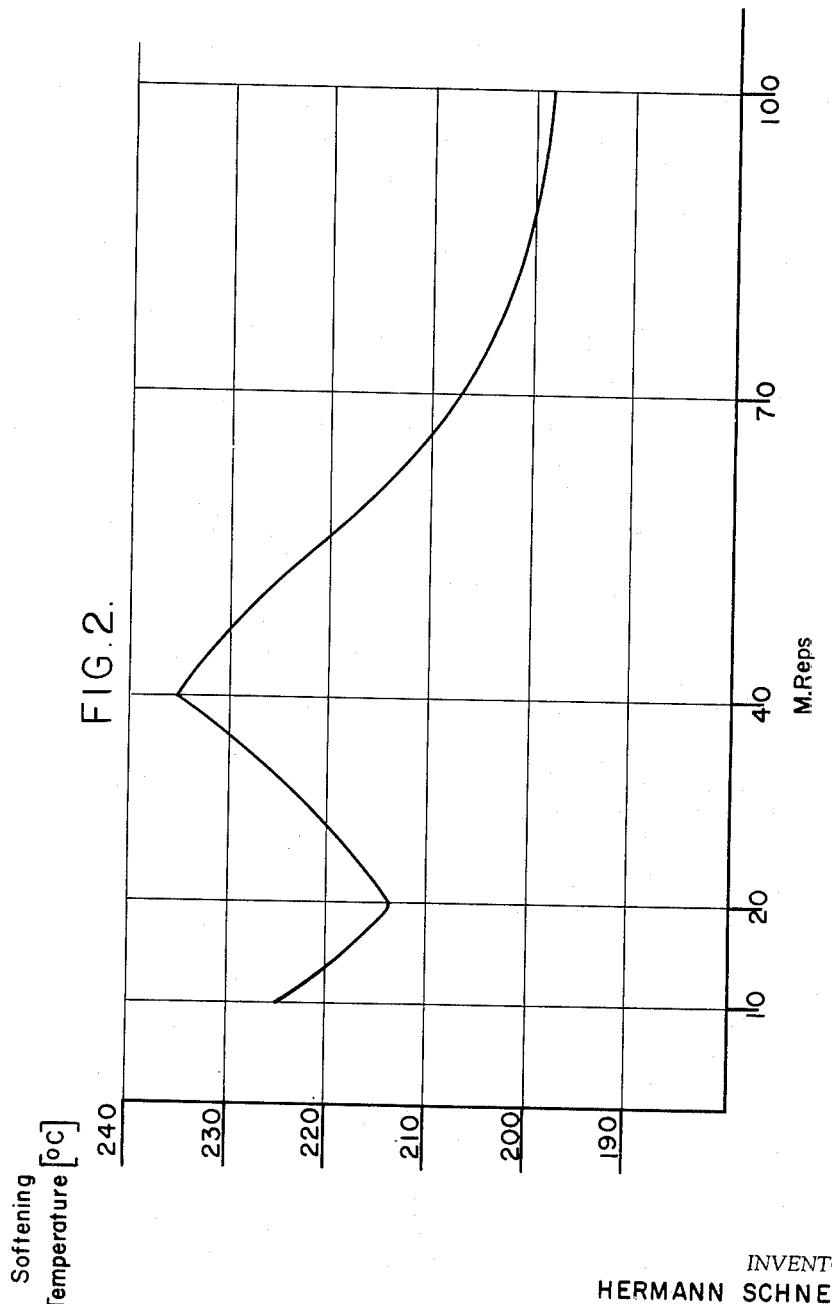

FIGURE 2 shows the dependence of the beginning of softening of the same foil upon the irradiation dose in the case of irradiation under the same conditions. FIGURE 2 shows that the range of dosage which is effective for increasing the softening temperature ranges from a lower limit of about 31 to an upper limit of 52 mr.

Figure 3:
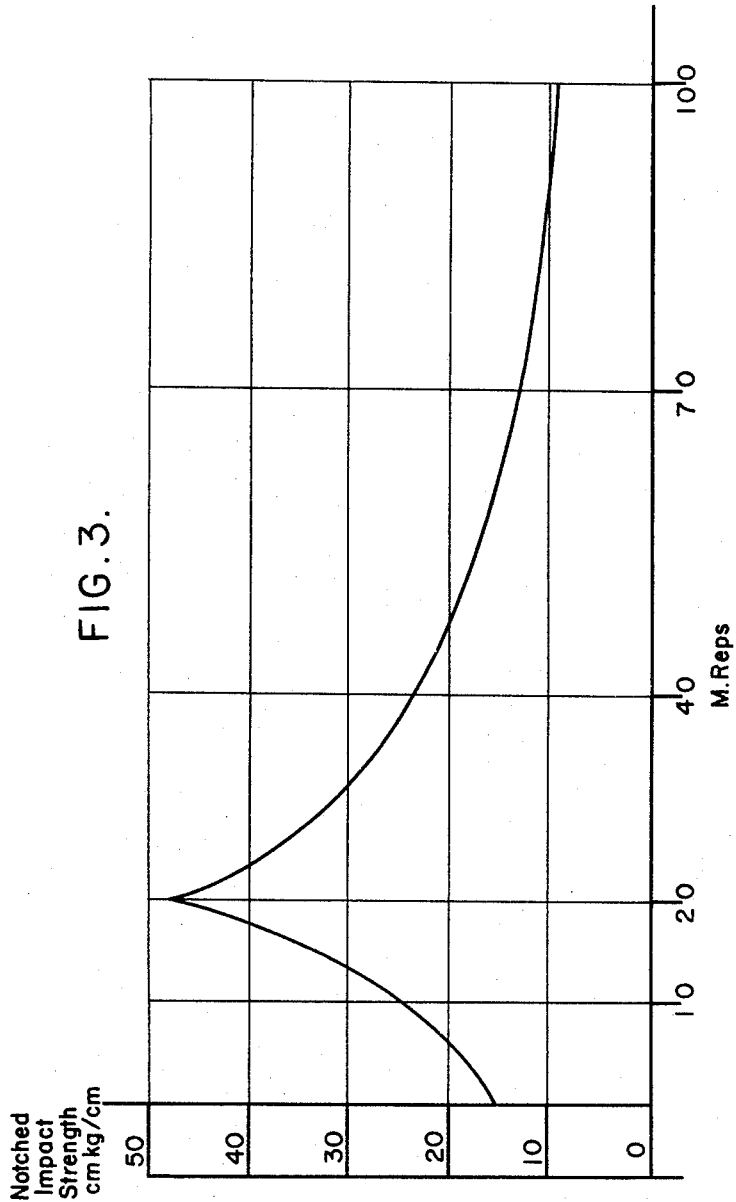

The dependence of the notched impact strength of an injection-moulded body made from a polycarbonate of the same type, but with a relative viscosity of 1.35, upon the irradiation dose with the same irradiation conditions is, as shown in FIGURE 3, especially impressive. FIGURE 3 shows that the notched impact strength of the same type of polycarbonate begins to rise as soon as it is exposed to radiation and it remains above its starting value until a dosage of 61 mr. is attained. This establishes that the lower and upper limits of the radiation dosage which should be applied to increase the notched impact strength will be from about 1 to about 61 mr.

In FIGURE 4 there is also shown the alteration of the notched impact strength of injection-moulded bodies made from a polycarbonate of the same type with a relative viscosity of 1.282 in relation to the irradiation dose when hard X-rays ($CO^{60}$ —1.17 and 1.31 mega electron volts) in air at room temperature are used.

The FIGURES 1–4 teach that the optimum of the improvement of some physical properties of poly-[2,2-(4,4′-dihydroxy-diphenyl)-propane carbonates] are obtained by irradiation doses from about 20–40 M.Rep.

In FIGURE 5 there is shown the alteration of the tensile strength of a foil made from a polycarbonate of 2,2-(4,4′-dihydroxy-3,3′,5,5′-tetrachloro - diphenyl) - propane with a relative viscosity of 1.67, measured in 0.5 percent methylene chloride solution at 25° C., in dependence upon the irradiation dose (Van de Graaf generator, 2 mega electron volts, irradiation in air at room temperature). The optimum of the improvement of the tensile strength of poly-[2,2-(4,4'-dihydroxy-3,3',5,5'-tetrachloro diphenyl)-propane carbonate] is obtained by an irradiation dose of about 25 M.Rep.

FIGURE 6 shows the alteration of the tensile strength and of the elongation of a foil made from a polycarbonate of 4,4'-dihydroxy-diphenyl sulfide with the relative viscosity of 2.330 in dependence upon the irradiation dose (conditions as in FIGURE 5). The optimum of the improvement of the tensile strength of poly-(4,4'-dihydroxy-diphenyl sulfide carbonate) is obtained by an irradiation dose of about 20 M.Rep.

FIGURE 7 shows the alteration of the tensile strength of a foil made from a polycarbonate based upon 50 mol percent 4,4'-dihydroxy-diphenyl sulfone and 50 mol percent 4,4'-dihydroxy-3,3'-dimethyl-diphenyl sulfone with a relative viscosity of 1.240 in dependence of the irradiation dose (conditions as in FIGURE 5). The optimum of the improvement of the tensile strength of mixed poly-(4,4'-dihydroxy-diphenyl sulfone and 4,4'-dihydroxy-3,3'-dimethyl diphenyl sulfone carbonate) is obtained by an irradiation dose of about 10 M.Rep.

We claim:

1. A process for increasing the tensile strength of linear high molecular weight polycarbonates selected from the group consisting of polydihydroxy-diaryl alkane carbonates, polydihydroxy-diaryl ether carbonates, polydihydroxy-diaryl thioether carbonates, and polydihydroxy-diaryl sulfone carbonates which comprises treating said polycarbonates with a radiation dosage of about 1-100 mr.

2. A process for increasing the elasticity of linear high molecular weight polycarbonates selected from the group consisting of polydihydroxy-diaryl alkane carbonates, polydihydroxy-diaryl ether carbonates, polydihydroxy-diaryl thioether carbonates, and polydihydroxy-diaryl sulfone carbonates which comprises exposing said polycarbonates to a radiation dosage of about 15 to about 71 mr.

3. A process for increasing the notched impact strength of linear high molecular weight polycarbonates selected from the group consisting of polydihydroxy-diaryl alkane carbonates, polydihydroxy-diaryl ether carbonates, polydihydroxy-diaryl thioether carbonates, and polydihydroxy-diaryl sulfone carbonates which comprises exposing said polycarbonates to a radiation dosage of about 1-61 mr.

4. A process for increasing the tensile strength, elasticity, and notched impact strength of linear high molecular weight polycarbonates selected from the group consisting of polydihydroxy-diaryl alkane carbonates, polydihydroxy-diaryl ether carbonates, polydihydroxy-diaryl thioether carbonates, and polydihydroxy-diaryl sulfone carbonates which comprises treating said polycarbonates with neutron rays with a dose of about 15 to about 61 mega Roentgen equivalent physicals.

5. A process for increasing the tensile strength, elasticity, and notched impact strength of linear high molecular weight polycarbonates selected from the group consisting of polydihydroxy-diaryl alkane carbonates, polydihydroxy-diaryl ether carbonates, polydihydroxy-diaryl thioether carbonates, and polydihydroxy-diaryl sulfone carbonates which comprises treating said polycarbonates with electron rays with a dose of about 15 to about 61 mega Roentgen equivalent physicals.

6. A process for increasing the tensile strength, elasticity, and notched impact strength of linear high molecular weight polycarbonates selected from the group consisting of polydihydroxy-diaryl alkane carbonates, polydihydroxy-diaryl ether carbonates, polydihydroxy-diaryl thioether carbonates, and polydihydroxy-diaryl sulfone carbonates which comprises treating said polycarbonates with Roentgen rays with a dose of about 15 to about 61 mega Roentgen equivalent physicals.

7. A process for increasing the tensile strength, elasticity, and notched impact strength of linear high molecular weight polycarbonates selected from the group consisting of polydihydroxy-diaryl alkane carbonates, polydihydroxy-diaryl ether carbonates, polydihydroxy-diaryl thioether carbonates, and polydihydroxy-diaryl sulfone carbonates which comprises treating said polycarbonates with gamma rays with a dose of about 15 to about 61 mega Roentgen equivalent physicals.

8. A process for increasing the softening temperature of linear high molecular weight polycarbonates selected from the group consisting of polydihydroxy-diaryl alkane carbonates, polydihydroxy-diaryl ether carbonates, polydihydroxy-diaryl thioether carbonates, and polydihydroxy-diaryl sulfone carbonates which comprises treating said polycarbonates with neutron rays with a dose of about 31 to about 52 mega Roentgen equivalent physicals.

9. A process for increasing the softening temperature of linear high molecular weight polycarbonates selected from the group consisting of polydihydroxy-diaryl alkane carbonates, polydihydroxy-diaryl ether carbonates, polydihydroxy-diaryl thioether carbonates, and polydihydroxy-diaryl sulfone carbonates which comprises treating said polycarbonates with electron rays with a dose of about 31 to about 52 mega Roentgen equivalent physicals.

10. A process for increasing the softening temperature of linear high molecular weight polycarbonates selected from the group consisting of polydihydroxy-diaryl alkane carbonates, polydihydroxy-diaryl ether carbonates, polydihydroxy-diaryl thioether carbonates, and polydihydroxy-diaryl sulfone carbonates which comprises treating said polycarbonates with Roentgen rays with a dose of about 31 to about 52 mega Roentgen equivalent physicals.

11. A process for increasing the softening temperature of linear high molecular weight polycarbonates selected from the group consisting of polydihydroxy-diaryl alkane carbonates, polydihydroxy-diaryl ether carbonates, polydihydroxy-diaryl thioether carbonates, and polydihydroxy-diaryl sulfone carbonates which comprises treating said polycarbonates with gamma rays with a dose of about 31 to about 52 mega Roentgen equivalent physicals.

References Cited in the file of this patent

UNITED STATES PATENTS

| | | |
|---|---|---|
| 2,821,539 | Newman et al. | Jan. 28, 1958 |
| 2,897,127 | Miller | July 28, 1959 |
| 2,904,480 | Rainer et al. | Sept. 15, 1959 |
| 2,917,534 | Sims et al. | Dec. 15, 1959 |

OTHER REFERENCES

Schnell: Polycarbonates, Agnew, Chem., vol. 68, No. 20 (1956), pages 633-640.

Harrington et al.: "Chemical and Physical Changes in Gamma-Irradiated Plastics," Modern Plastics, pages 199, 200, 202, 204, 206, 208-10, 212, 214, 217, 220, 221, 314, 317 (November 1958).

Colichman et al.: "Modern Plastics," pages 180, 182, 184, 186, 282, October 1957.